(12) United States Patent
Nivet et al.

(10) Patent No.: US 6,583,596 B2
(45) Date of Patent: Jun. 24, 2003

(54) SEAT WITH MOVING PARTS

(75) Inventors: Laurent Nivet, Asnieres (FR); Loïc Thoreux, Courbevoie (FR)

(73) Assignee: Labinal, Montigny-le-Bretonneux (FR)

( * ) Notice: Subject to any disclaimer, the term of this patent is extended or adjusted under 35 U.S.C. 154(b) by 0 days.

(21) Appl. No.: 10/081,213

(22) Filed: Feb. 25, 2002

(65) Prior Publication Data

US 2002/0158497 A1 Oct. 31, 2002

(30) Foreign Application Priority Data

Feb. 27, 2001 (FR) .............................. 01 02668

(51) Int. Cl.$^7$ ................................. G05G 5/00
(52) U.S. Cl. .................... 318/626; 318/568.1; 318/652; 297/65; 297/327
(58) Field of Search ................. 318/626, 568.1, 318/652; 297/65, 327

(56) References Cited

U.S. PATENT DOCUMENTS

| | | | | |
|---|---|---|---|---|
| 4,463,426 A | * | 7/1984 | Caddick et al. ............. | 701/49 |
| 4,467,252 A | * | 8/1984 | Takeda et al. ............. | 318/603 |
| 4,698,571 A | * | 10/1987 | Mizuta et al. ............. | 318/568.1 |
| 5,651,587 A | | 7/1997 | Kodaverdian | |
| 5,765,916 A | | 6/1998 | Patel | |
| 5,812,399 A | * | 9/1998 | Judic et al. ............. | 701/49 |
| 5,964,455 A | * | 10/1999 | Catanzarite et al. ....... | 267/131 |
| 6,042,145 A | * | 3/2000 | Mitschelen et al. ........ | 280/735 |
| 6,441,576 B1 | * | 8/2002 | Marin-Martinod et al. ... | 318/568.1 |

FOREIGN PATENT DOCUMENTS

| | | |
|---|---|---|
| FR | 2 736 879 | 1/1997 |
| FR | 2 801 480 | 6/2001 |
| FR | 2 801 848 | 6/2001 |

* cited by examiner

*Primary Examiner*—Rita Leykin
(74) *Attorney, Agent, or Firm*—Larson & Taylor PLC

(57) ABSTRACT

The seat has moving parts, at least one actuator, and a control unit. The control unit comprises:
 tracking means for tracking the current position of each actuator; and
 management means for managing the control of each actuator.

The management means comprise:
 computation means for computing the current position of a critical point of the seat;
 evaluation means for evaluating the current position of each critical point of the seat relative to a boundary; and
 control means for controlling at least one actuator independently of the control selected by the user.

9 Claims, 3 Drawing Sheets

SEAT WITH MOVING PARTS

The present invention relates to a seat comprising parts that are movable relative to one another, at least one actuator for controlling at least one moving part of the seat, and a control unit for controlling the or each actuator, said control unit comprising:

user control means for controlling a main actuator selected by a user;

tracking means for tracking the current position of the or each actuator; and management means for managing the control of the or each actuator and adapted to ensure that no moving part of the seat reaches a forbidden region.

BACKGROUND OF THE INVENTION

Such a seat may be a vehicle seat, for example, suitable for being used in particular in airliners.

For example, such a seat comprises a seat proper having hinged relative thereto a back which is surmounted by a movable headrest. In addition, a leg support is hinged to the seat proper and the leg support is extended by a sliding footrest. The seat proper itself is hinged relative to the fixed underframe of the seat.

Each moving part of the seat is driven by a respective actuator relative to some other part of the seat with which it is associated.

Means for tracking the current position of each actuator are implemented so as to be able to determine continuously the configuration of the seat and the relative positions of the various moving elements relative to one another.

In addition, the seat control unit has means for managing the control of each of the actuators so as to ensure that certain parts of the seat do not strike obstacles, which could lead to the obstacles being damaged, e.g. when the obstacles are constituted by baggage. In addition, avoiding obstacles serves to increase seat lifetime, by ensuring that the seat does not damage itself by making repeated contact with such obstacles.

Such a seat provided with means for ensuring that the footrest does not come into contact with the floor is described, for example, in U.S. Pat. No. 5,651,587.

In the device described in that document, the seat control unit is adapted to perform various tests directly on the positions of the various actuators.

The tests consist in comparing the values supplied by one or more actuators with a set of predetermined threshold values, the threshold values being defined as a function of the geometrical configuration of the seat so as to ensure that the footrest does not strike the floor.

Although that solution for managing the actuators does indeed make it possible to prevent the footrest from striking the floor, it is extremely difficult to define the threshold values once the seat itself comprises a large number of parts that are movable relative to one another and that are associated with at least as many corresponding actuators.

In practice, the predetermined threshold values are fixed so as to avoid an element striking an obstacle, and for this to be true regardless of the positions of any of the other elements of the seat.

Consequently, very many potential configurations of the seat are forbidden.

OBJECTS AND SUMMARY OF THE INVENTION

An object of the invention is to provide a seat comprising a control unit which is easy to configure while nevertheless giving access to very many seat configurations without running the risk of a moving element of the seat striking an obstacle.

To this end, the invention provides a seat of the above-specified type, wherein said management means comprise:

computation means for computing, in a frame of reference associated with a fixed portion of the seat, the current position of at least one predetermined critical point of the seat on the basis of the current position(s) of the or each actuator, and on the basis of the geometrical characteristics of the seat;

evaluation means for evaluating the current position of the or each critical point of the seat relative to an associated predetermined boundary in said frame of reference and defining said forbidden region; and control means for controlling at least one actuator independently of the control selected by the user.

In particular embodiments, the seat further comprises one or more of the following characteristics:

said computation means are adapted to compute the current position of the or each predetermined point in a cartesian frame of reference;

said boundary comprises a set of straight line segments;

said evaluation means are adapted to compare a distance between the current position of the or each critical point and said associated boundary with at least one predetermined threshold value;

the seat includes a plurality of actuators and means for tracking the current position of each actuator, and said means for computing the current position, in said frame of reference, of the or each critical point are adapted to perform the computation on the basis of the current position of each actuator;

said control means are adapted to control a secondary actuator different from the main actuator selected by the user in order to move the or each critical point away from said associated boundary whenever the distance between the current position of at least one critical point and the associated boundary becomes less than a first predetermined threshold value;

said control means are adapted to stop the main actuator when the distance between the current position of at least one critical point and the associated boundary becomes less than a second predetermined threshold value smaller than said first predetermined threshold value;

the seat includes means for modifying said predetermined boundary over time; and said means for modifying said predetermined boundary over time are adapted to modify said boundary as a function of the position of a moving element in the surroundings of said seat.

BRIEF DESCRIPTION OF THE DRAWINGS

The invention will be better understood on reading the following description given purely by way of example and made with reference to the drawings, in which.

MORE DETAILED DESCRIPTION

Figure 1:
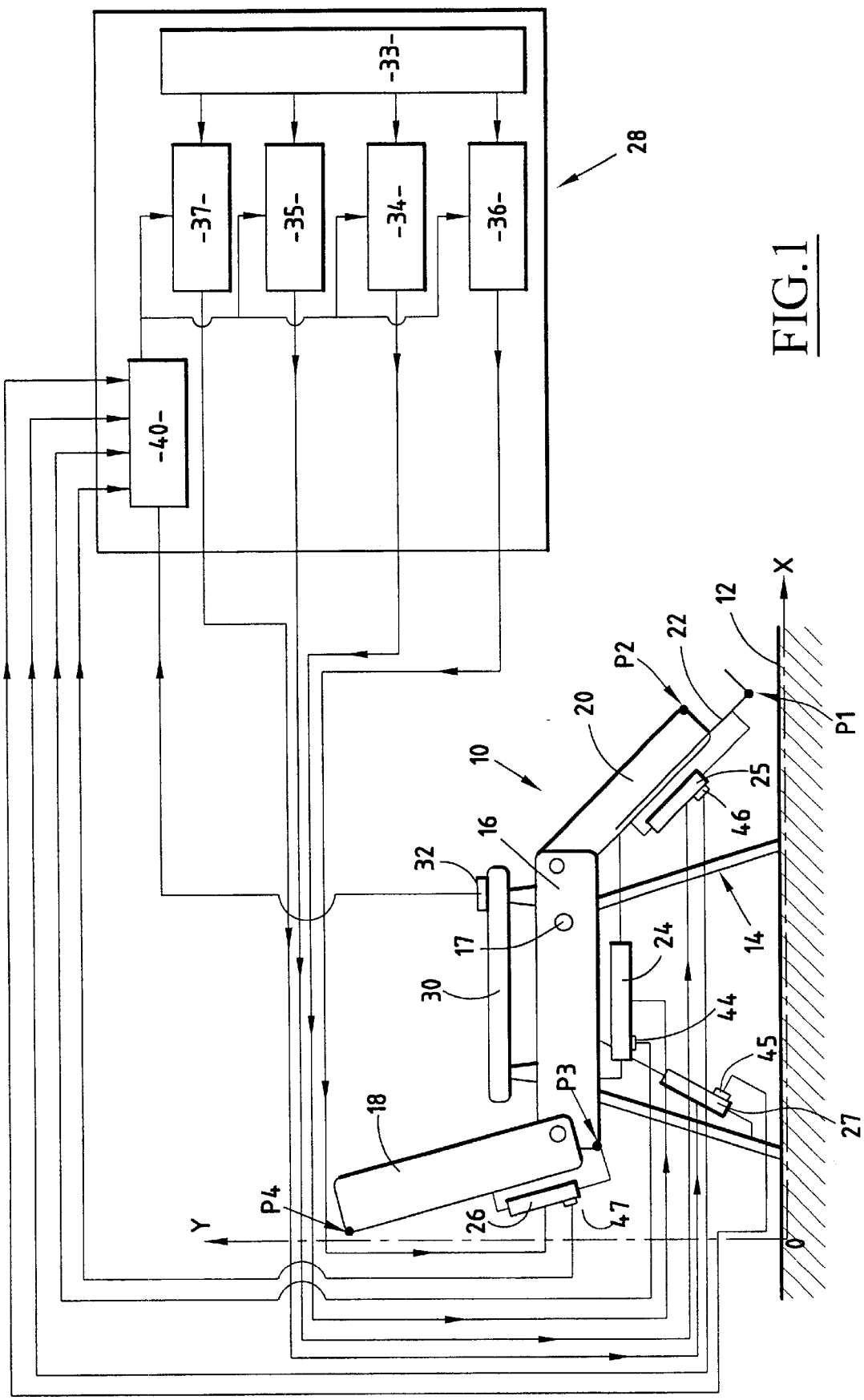
FIG. 1 is a diagrammatic view of a vehicle seat of the invention.

The seat 10 shown in FIG. 1 is a seat for an airplane passenger. The seat is fixed to the floor 12 of the cabin.

The seat 10 comprises a underframe 14 secured to the floor 12 and having a seat proper 16 hinged thereto about a transverse axis 17.

At one end of the seat proper there is hinged a back 18 which can be moved between a raised position which is substantially vertical and a folded-down position which is substantially horizontal.

At the other end of the seat proper 16 there is hinged a leg rest 20 which is movable between a substantially vertical folded-down position below the seat proper 16 and a substantially horizontal position extending the seat proper 16. The leg rest is carried by the seat proper 16.

The seat 10 also has a footrest 22 slidably mounted to move relative to the leg rest 20 longitudinally relative thereto.

The footrest 22 can be moved between a position where it is retracted into the leg rest 20, and an extended position in which it extends the leg rest and is almost entirely outside it.

A first electric actuator 24 is mounted between the seat proper 16 and the leg rest 20 to move the leg rest between its folded-down position and its extended position.

Similarly, a second actuator 25 is provided between the leg rest 20 and the footrest 22 to move footrest between its retracted position and its extended position.

A third actuator 26 is mounted between the seat proper 16 and the back 18 to move the back between its raised position and its folded-down position.

A fourth actuator 27 is mounted between the seat proper 16 and the underframe 14 in order to tilt the seat proper.

The four actuators operate at constant speeds which may be different from one actuator to another.

Each of the four actuators 24, 25, 26, and 27 is electrically powered from a central control unit 28. This control unit is separately connected to each of the actuators 24, 25, 26, and 27 in order to control them independently.

In addition, the seat includes an armrest 30 having a control pad 32 fixed thereto for independently controlling the actuators 24, 25, 26, and 27 in order to cause them to move.

The unit 28 includes an actuator power supply 33. This power supply is constituted, for example, by a transformer connected to the general electrical power supply of the airplane via appropriate connection means.

Each actuator is provided with a respective power interface 34, 35, 36, and 37 via which the respective actuators 24, 25, 26, and 27 are powered from the power supply 33. These interfaces define the actuator power supply currents as a function of the desired direction of actuation.

The power supply interfaces 34 to 37 are controlled by a data processor unit 40. The unit 40 is connected to the control pad 32 in order to receive instructions from the passenger.

The data processor unit 40 can comprise, for example, a microprocessor suitable for running a suitable program as described below.

Finally, each actuator 24, 25, 26, and 27 is fitted with one or more position sensors.

These sensors are referenced 44, 45, 46, and 47 respectively for the actuators 24, 25, 26, and 27, and they are connected to the data processor unit 40. The unit 40 is thus informed about the current position of each actuator.

By way of example, the sensors can be constituted by potentiometers installed between the fixed and moving portions of the actuators.

To operate the seat, the data processor unit 40 implements a conventional program adapted to control the power supply interfaces 34 to 37 so that they power the actuators 25 to 27 in one direction or the other by inverting the direction of current flow, as a function of information received from the unit 40.

In accordance with the invention, the program implemented by the data processor unit 40 is adapted, on receiving an instruction from the passenger via the control pad 32, to move a portion of the seat while ensuring that the moving parts do not move beyond a predetermined virtual boundary. This predetermined boundary is set at a distance from an obstacle, e.g. another seat placed in front of or behind the seat in question.

The algorithm implemented for controlling the seat is adapted to determine the position of a set of predetermined critical points of the seat in an (O, X, Y) frame of reference, in particular a rectangular frame of reference associated with the fixed structure of the seat, and in particular the underframe 14.

By way of example, the critical points of the seat are constituted by the ends of the moving elements of the seat, these ends constituting portions of the seat that run the risk of striking an obstacle while the configuration of the seat is being changed.

In particular, a first critical point PI is formed by the bottom end of the footrest, and a second critical point P2 is formed by the free top end of the leg rest.

A third critical point P3 is formed by the bottom rear end of the hinged seat proper 16, and a final critical point P4 is constituted by the free rear end of the hinged back 18.

The (O, X, Y) frame of reference in which the cartesian coordinates of the critical points PI to P4 are determined is shown in FIG. 1. This frame of reference is a direct orthonormal frame whose abscissa axis extends horizontally along the surface of the floor and whose ordinate axis extends vertically. The origin 0 of the frame of reference is fixed relative to the underframe 14.

The data processor unit 40 implements a suitable program adapted to respond to the position value of each actuator and to the geometrical characteristics of the seat in order to determine the cartesian coordinates of each of the critical points P1 to P4 in the (O, X, Y) frame of reference linked to the underframe 14.

The cartesian coordinates of a critical point in the (O, X, Y) frame of reference are written $(X_{point}; Y_{point})$ Furthermore, the data processor unit 40 has means for storing a virtual boundary that is defined in the frame of reference, which boundary must not be crossed by any of the critical points P1 to P4.

Figure 2:
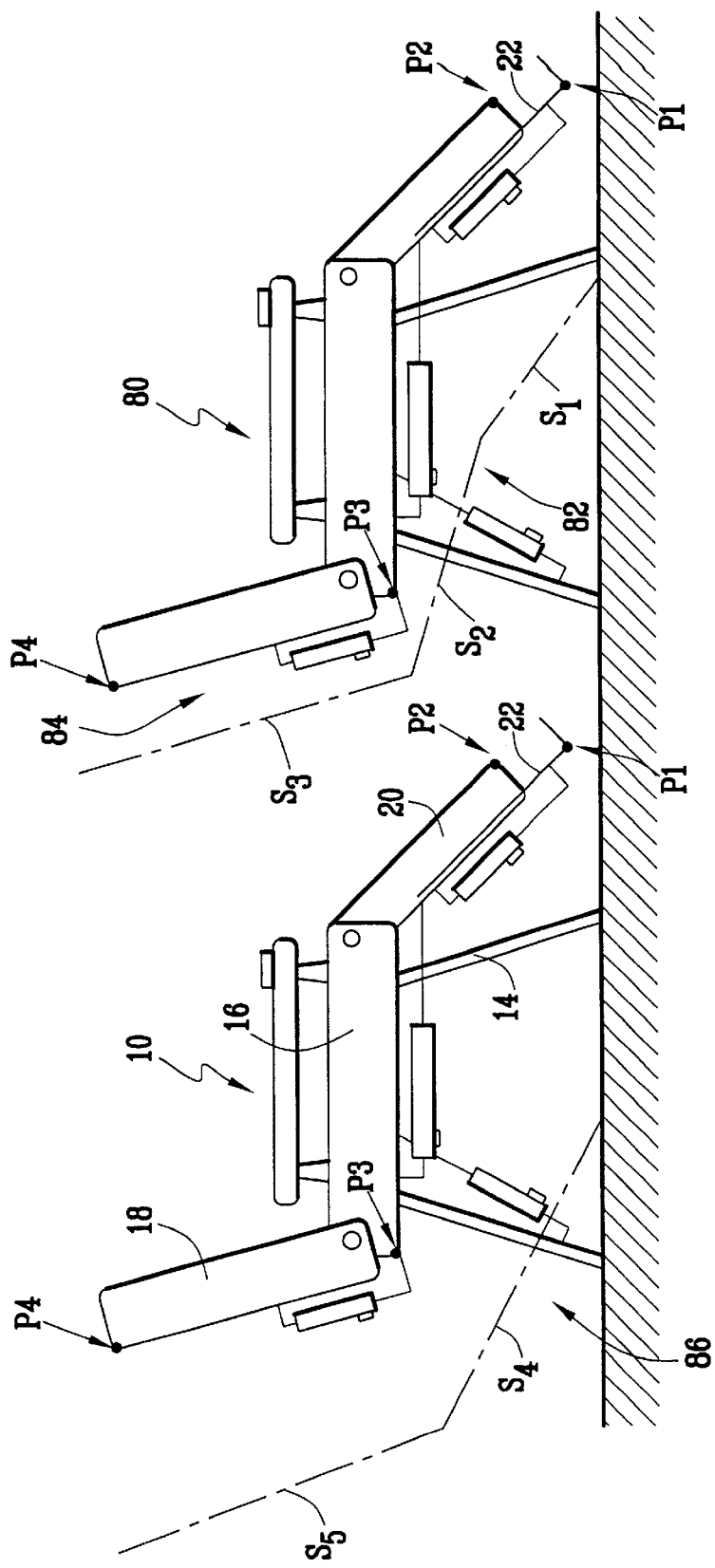
FIG. 2 is a diagrammatic view of two seats of the invention disposed one behind the other and illustrating the seat management means of the invention.

This boundary is preferably constituted by a set of rectilinear segments as shown in FIG. 2. Thus, in this figure, the boundary comprises a front envelope 82 for the seat defined by three successive segments S1, S2, and S3. This boundary must not be crossed by the critical points P1 and P2 in order to avoid any risk of collision between the footrest and the seat located immediately in front. The boundary 82 thus defines a forbidden zone referenced 84.

Similarly, behind the seat there is defined a boundary 106 constituted by two segments S4 and S5, which boundary is not to be crossed by the critical points P3 and P4 in order to ensure that the seat does not strike a passenger sitting behind or any baggage that the passenger might have placed at foot level.

Each of the segments S1 to S5 is stored in the form of a vector defined in the (O, X, Y) frame of reference by two coordinates x1 and y1, a length dx measured along the abscissa axis or the ordinate axis, a director coefficient a, and a vector direction vectSense.

Figure 3:
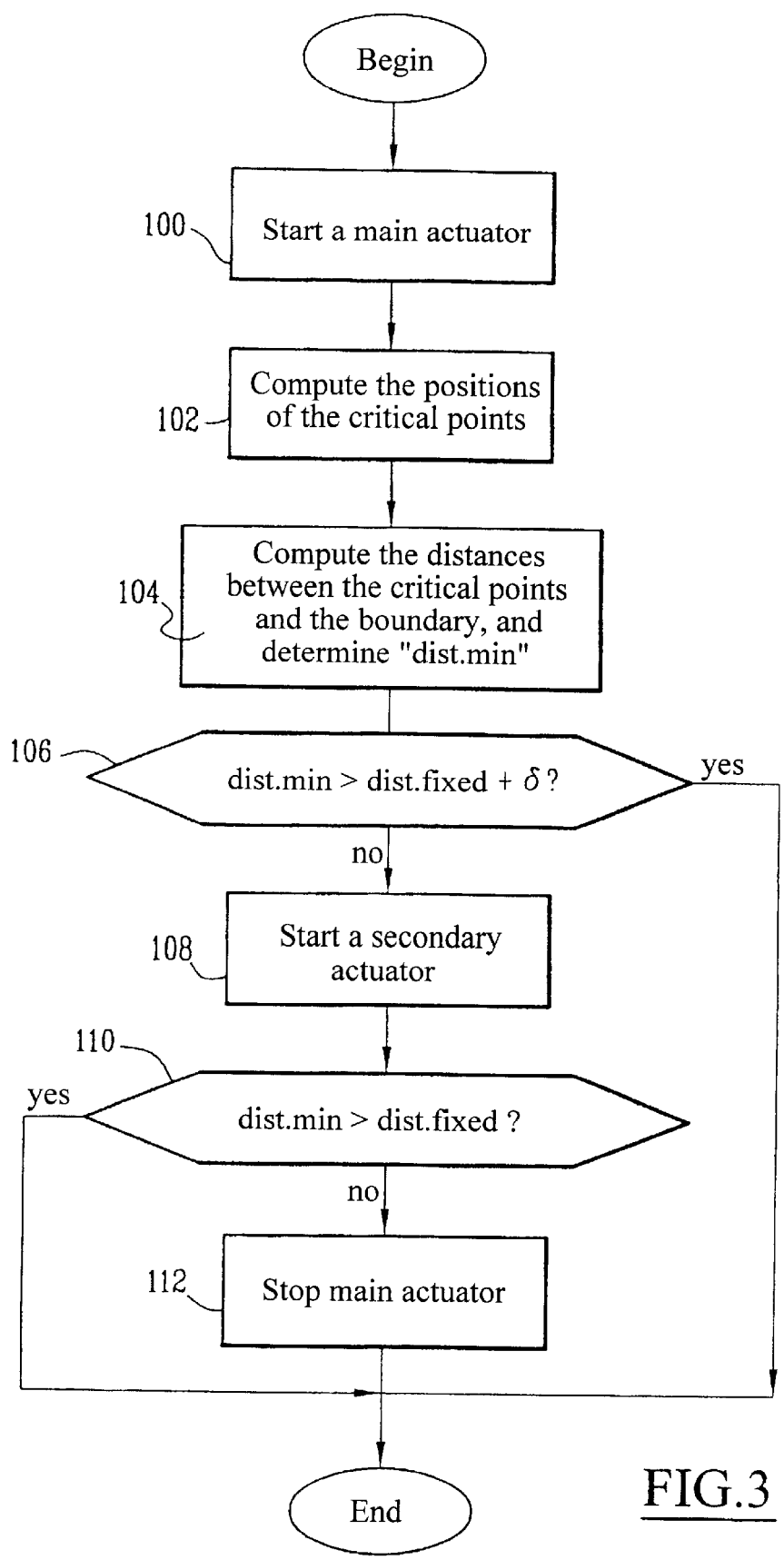
FIG. 3 is a flow chart of the algorithm implemented in the seat control unit of FIG. 1.

While the seat is in use, the algorithm whose flow chart is given in FIG. 3 is implemented cyclically, being repeated once every 50 milliseconds (ms), for example.

In step 100, the data processor unit 40 scans the control pad 32 to determine whether the user has instructed movement of a moving element of the seat. If so, the main actuator for moving the element in question is set into operation. In addition, as a function of the predefined notion of the linkage defined by the seat, certain secondary actuators not specifically intended for moving the specified element can also be set into motion in order to improve the comfort of the passenger while the specified element is moving.

In step 102, the unit 40 calculates the positions of the critical points P1 to P4 in the (O, X, Y) frame of reference.

For this purpose, Algorithm A listed below for calculating the positions is implemented.

Algorithm A calculates the abscissa and ordinate differences (dx and dy) to define the position of one or more critical points with the help of the positions of intermediate points. More precisely, each intermediate point corresponds to a point of a moving element. The new position of an intermediate point carried by the moving elements relative to the fixed structure of the seat is determined on the basis of the abscissa and ordinate differences (dx and dy) associated with the intermediate points as deduced by associated computation. Finally, the positions of the critical points are computed, these points constituting the last intermediate points of the loop.

---

CALCULATING THE POSITIONS OF THE CRITICAL POINTS
(calcPtPart)
$X_{point} = X_{ref}$; $Y_{point} = Y_{ref}$ (1st intermediate point)
loop over points (K_nbrPtPart)
. 1st intermediate point = $pt_{ref}$
. loop over the intermediate points. Associated with an actuator.
. . Compute dx, dy and ; as a function of "LgAct" etc.
. . depending (on sign and value of )
. . . sign dx of dx
. . . sign dy of dy
. . end depending
. . $X_{point} = X_{point} + dx$
. . $Y_{point} = Y_{point} + dy$
. end loop
. if (the critical point is valid)
. . update critical point table (tg_ptPart)
. . X and Y correction of coordinates of critical point
(tg_scrPtPart[iPtP].correctXY).
. . if (associated ZI vector)
. . . if (vector direction = horizontal)
. . . . x1, y1 of vector ZI = $X_{point}$, $Y_{point}$
. . . else
. . . . x1, y1 of vector ZI = $Y_{point}$, $X_{point}$
. . . end if
. . end if
. end if
end loop

---

Algorithm A implements a routine for calculating individual differences dx and dy respectively along the abscissa axis and the ordinate axis in order to determine the position of each critical point.

This routine computes individual differences dx, dy on the basis of the geometrical characteristics of the seat and on the basis of position values supplied by each actuator.

In step 104, the unit 40 computes, for each critical point P1 to P4, the distance between the critical point in question and the associated boundary. The associated boundary corresponds to the segment S1 to S5 that is closest to the critical point in question.

The minimum distance between each critical point and the boundary is determined. It is written "dist.min" in the flow chart of FIG. 3.

Step 104 is implemented by the Algorithm B. $Pt_{critical}$IN ZI (tg_ptPart; t_vectZI)

Verify whether a given point is in a forbidden zone (ZI). Depending on direction, test vertically on X, horizontally on Y.

--- loop over $Pt_{critical}$
. if (vector direction = horizontal)
. . if (X of $Pt_{critical}$ lies within current vector) $X_{vect} < X_{critical} < X_{vect} + dX$
. . . Ylimit = $a_{vect}$ X of $Pt_{critical}$ + $b_{vect}$
. . . if ($distance_{min}$ > absolute value (Y of $Pt_{critical}$ − $Y_{limit}$))
. . . . INC by $distance_{min}$
. . else
. . . if (Y of $Pt_{critical}$ lies in current vector) $X_{vect} < Y_{critical} < X_{vect} + dX$
. . . . $X_{limit}$ = $a_{vect}$ Y of $Pt_{critical}$ + $b_{vect}$
. . . . if ($distance_{min}$ > absolute value (X of $Pt_{critical}$ − $X_{limit}$))
. . . . . INC by $distance_{min}$
. . . end if
. . end if
end loop
return $distance_{min}$

---

This algorithm serves to compute "dist.min" which is the smallest of the distances of the critical points in question from the boundaries associated therewith. This distance is taken into account when making a comparison with the fixed value.

This minimum distance "dist.min" is compared in step 106 with a predetermined minimum distance written "dist.fixed" plus a predetermined value δ. This predetermined minimum distance "dist.fixed" plus δ forms a first threshold.

If this distance is greater than the distance "dist.fixed" plus δ, the algorithm comes to an end since, for the time being, the movement instructed by the passenger can be performed without any risk of a moving element of the seat striking an obstacle, since the distance between each of the critical points and the boundary is sufficient.

In contrast, if the distance is below the predetermined threshold "dist.fixed", a secondary actuator is switched on in step 108. The secondary actuator involved is different from the main actuator acting on the element whose movement has been instructed by the passenger. The secondary actuator is defined by the data processor unit 40 and it is caused to operate in a direction such as to cause the critical point to move away from the associated boundary, even if the main actuator continues to be moved in the original direction.

In step 110, the distance of the critical point is compared with a second threshold value "dist.fixed" corresponding to a minimum distance. If this condition is satisfied, then the algorithm terminates.

In contrast, if this condition is not satisfied, the main actuator is stopped in step 112, since the action of the secondary actuator switched on in step 108 cannot prevent the moving element of the seat from striking an obstacle if the main actuator is kept in operation.

It will be understood that by implementing such an algorithm, it is easy to define mathematically the boundary elements 82 and 86, since the way the boundary is defined does not depend on the moving elements of the seat, but only on the environment around the seat.

Furthermore, the tests performed for deciding whether or not to stop the seat or to switch on a secondary actuator are very simple to program since they relate to comparisons between predefined critical points of the seat whose real coordinates are computed and a portion of the predefined boundary.

This algorithm merely requires accurate computation of the positions of the critical points of the seat in the predetermined frame of reference, which positions are relatively easy to compute on the basis of the position values supplied by each of the actuators and on the basis of knowledge concerning the geometrical structure of the seat.

It will thus be understood that the algorithm implemented enables the seat to reach a very large number of configurations, which configurations are defined within a volume determined by the predetermined virtual boundary.

Furthermore, in the example under consideration, the boundary is defined by a set of segments whose position in the (O, X, Y) frame of reference are fixed over time.

In a variant, at least part of the definition of the virtual boundary can vary over time, for example as a function of the known position of a moving obstacle in the vicinity of the seat.

Such a moving obstacle can be constituted, for example, by a motor-driven pouf or footstool movable on the surface of the floor.

Under such circumstances, the boundary is defined as being at a fixed distance from the footstool, with the definition of this boundary varying as a function of time depending on the real position of the footstool.

Under such circumstances, each time the algorithm shown in FIG. 3 is implemented cyclically, the position of the boundary in the (O, X, Y) frame of reference is recomputed as a function of the position of the footstool during each cycle.

Furthermore, when a seat of the kind described is associated with a moving footstool, the footstool control means also implement an algorithm of the invention so that a virtual boundary is defined by the envelope of the seat and the footstool control means are adapted to ensure that any of the critical points defined relative to the footstool crosses the virtual boundary associated with the seat.

Because of the movements of the seat, the virtual boundary associated with the seat varies over time.

In other words, the seat and the footstool constitute two "seats" of the invention with control means adapted to avoid any risk of a moving element of either of them coming too close to the other, with this being done by implementing a virtual boundary associated with the seat and a virtual boundary associated with the footstool.

What is claimed is:

1. A seat comprising parts that are movable relative to one another, at least one actuator for controlling at least one moving part of the seat, and a control unit for controlling the or each actuator, said control unit comprising:

user control means for controlling a main actuator selected by a user;

tracking means for tracking the current position of the or each actuator; and management means for managing the control of the or each actuator and adapted to ensure that no moving part of the seat reaches a forbidden region;

wherein said management means comprise:

computation means for computing, in a frame of reference associated with a fixed portion of the seat, the current position of at least one predetermined critical point of the seat on the basis of the current position (s) of the or each actuator, and on the basis of the geometrical characteristics of the seat;

evaluation means for evaluating the current position of the or each critical point of the seat relative to an associated predetermined boundary in said frame of reference and defining said forbidden region; and control means for controlling at least one actuator independently of the control selected by the user.

2. A seat according to claim 1, wherein said computation means are adapted to compute the current position of the or each predetermined point in a cartesian frame of reference.

3. A seat according to claim 1, wherein said boundary comprises a set of straight line segments.

4. A seat according to claim 1, wherein said evaluation means are adapted to compare a distance between the current position of the or each critical point and said associated boundary with at least one predetermined threshold value.

5. A seat according to claim 1, including a plurality of actuators and means for tracking the current position of each actuator, and wherein said means for computing the current position, in said frame of reference, of the or each critical point are adapted to perform the computation on the basis of the current position of each actuator.

6. A seat according to claim 1, wherein said control means are adapted to control a secondary actuator different from the main actuator selected by the user in order to move the or each critical point away from said associated boundary whenever the distance between the current position of at least one critical point and the associated boundary becomes less than a first predetermined threshold value.

7. A seat according to claim 6, wherein said control means are adapted to stop the main actuator when the distance between the current position of at least one critical point and the associated boundary becomes less than a second predetermined threshold value smaller than said first predetermined threshold value.

8. A seat according to claim 1, including means for modifying said predetermined boundary over time.

9. A seat according to claim 8, wherein said means for modifying said predetermined boundary over time are adapted to modify said boundary as a function of the position of a moving element in the surroundings of said seat.

* * * * *